(12) United States Patent
Yanase et al.

(10) Patent No.: US 7,277,892 B2
(45) Date of Patent: Oct. 2, 2007

(54) DATABASE PROCESSING SYSTEM, METHOD, PROGRAM AND PROGRAM STORAGE DEVICE

(75) Inventors: Koji Yanase, Yokohama (JP); Seiichi Maniwa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 471 days.

(21) Appl. No.: 10/784,212

(22) Filed: Feb. 24, 2004

(65) Prior Publication Data

US 2004/0167922 A1 Aug. 26, 2004

Related U.S. Application Data

(63) Continuation of application No. 09/645,543, filed on Aug. 25, 2000, now abandoned.

(30) Foreign Application Priority Data

May 22, 2000 (JP) .............................. 2000-154335

(51) Int. Cl.
*G06F 17/30* (2006.01)
(52) U.S. Cl. ............................. 707/101; 707/2; 707/3
(58) Field of Classification Search ................... None
See application file for complete search history.

(56) References Cited

U.S. PATENT DOCUMENTS

| 5,515,531 | A | 5/1996 | Fujiwara et al. ................ 707/3 |
|---|---|---|---|
| 5,761,652 | A | 6/1998 | Wu et al. ........................ 707/2 |
| 5,864,842 | A * | 1/1999 | Pederson et al. ............... 707/3 |
| 5,983,215 | A | 11/1999 | Ross et al. ....................... 707/2 |
| 6,003,036 | A | 12/1999 | Martin ......................... 707/102 |
| 6,161,105 | A * | 12/2000 | Keighan et al. ............. 707/100 |
| 6,223,182 | B1 * | 4/2001 | Agarwal et al. ............. 707/102 |
| 6,339,769 | B1 * | 1/2002 | Cochrane et al. ............... 707/2 |
| 6,421,612 | B1 | 7/2002 | Agrafiotis et al. ............. 702/19 |
| 6,665,682 | B1 * | 12/2003 | DeKimpe et al. ........... 707/101 |
| 2002/0194157 | A1 * | 12/2002 | Zait et al. ....................... 707/2 |

FOREIGN PATENT DOCUMENTS

| JP | 06-139119 | 5/1994 |
|---|---|---|
| JP | 06-314299 | 11/1994 |
| JP | 10-240744 | 9/1998 |
| JP | 10-269225 | 10/1998 |

\* cited by examiner

*Primary Examiner*—Khanh B. Pham
(74) *Attorney, Agent, or Firm*—Mattingly, Stanger, Malur & Brudnidge, P.C.

(57) ABSTRACT

To perform data search from a multiphase viewpoint in a circumstance where a multidimensional database if only one partitioning key is used all data is to be subject of searching. Also, the improvement of the same is dependent on the system configuration of hardware. The partitioning table is defined by specifying a partitioning condition for each of respective partitioning keys to simultaneously specifying a plurality of storage areas of multi-dimension made of a combination of these partitioning ranges. From the partitioning definition information stored in the dictionary table on the same layer, the storage area to be searched may be narrowed to the least necessary even when any partitioning key value is specified as the search condition.

9 Claims, 9 Drawing Sheets

CREATE TABLE SALE ACHIEVEMENT (REGISTRATION DAY DATE, BRANCH CODE NUMBER CHAR (4),
GOODS CLASSIFICATION CHAR (5), GOODS CODE NUMBER CHAR (5), UNIT PRICE DEC, ·····)
PARTITIONED BY REGISTRATION DAY ('1996-03-31', '1998-03-31'),
              BRANCH CODE NUMBER ('0999', '3999'),
              GOODS CLASSIFICATION ('B-999', 'F-999')
IN (((A111, A112, A113), (A121, A122, A123), (A131, 132, 133)),
  ((A211, A212, A213), (A221, A222, A223), (A231, 232, 233)),
  ((A311, A312, A313), (A321, A322, A323), (A331, 332, 333)))

FIG. 3

CONTENTS OF THE DICTIONARY TABLES THAT MANAGES PARTITION DEFINITION INFORMATION
D301 (110: PARTITIONING KEY DEFINITION INFORMATION MANAGEMENT TABLE)

| TABLE NAME | PARTITIONING KEY ID | NAME OF COLUMN THAT IS A MEMBER OF THE PARTITIONING KEY | DATA TYPE | THE NUMBER OF KEY RANGES BY BOUNDARY VALUES |
|---|---|---|---|---|
| SALE ACHIEVEMENT | 1 | REGISTRATION DAY | DATE | 3 |
| SALE ACHIEVEMENT | 2 | BRANCH CODE NUMBER | CHAR (4) | 3 |
| SALE ACHIEVEMENT | 3 | GOODS CLASSIFICATION | CHAR (5) | 3 |

D302 (120: KEY RANGE INFORMATION MANAGEMENT TABLE)

| TABLE NAME | PARTITIONING KEY ID | BOUNDARY VALUE ($\leq$) | KEY RANGE NUMBER |
|---|---|---|---|
| SALE ACHIEVEMENT | 1 | '1996-03-31' | 1 |
| SALE ACHIEVEMENT | 1 | '1998-03-31' | 2 |
| SALE ACHIEVEMENT | 1 | MAXIMUM VALUE (INFINITY) | 3 |
| SALE ACHIEVEMENT | 2 | '0999' | 1 |
| SALE ACHIEVEMENT | 2 | '3999' | 2 |
| SALE ACHIEVEMENT | 2 | MAXIMUM VALUE (INFINITY) | 3 |
| SALE ACHIEVEMENT | 3 | 'B-999' | 1 |
| SALE ACHIEVEMENT | 3 | 'F-999' | 2 |
| SALE ACHIEVEMENT | 3 | MAXIMUM VALUE (INFINITY) | 3 |

D303 (130: PARTITIONED TABLE STORAGE AREA MANAGEMENT TABLE)

| TABLE NAME | STORAGE AREA ORDER NUMBER | STORAGE AREA NAME |
|---|---|---|
| SALE ACHIEVEMENT | 1 | A111 |
| SALE ACHIEVEMENT | 2 | A112 |
| SALE ACHIEVEMENT | 3 | A113 |
| ⋮ | ⋮ | ⋮ |
| SALE ACHIEVEMENT | 26 | A332 |
| SALE ACHIEVEMENT | 27 | A333 |

FIG. 4

CONTENTS OF THE DICTIONARY TABLE THAT MANAGES THE DEFINITION
INFORMATION OF STORAGE AREAS
D401 (140: STORAGE AREA DEFINITION INFORMATION MANAGEMENT TABLE)

| STORAGE AREA NAME | PROCESSOR NAME (NODE NAME) | INFORMATION OF THE EXTERNAL STORAGE DEVICE (FILE NAME) |
|---|---|---|
| ⋮ | | |
| A111 | | |
| A112 | | |
| A113 | | |
| A121 | | |
| A122 | | |
| A123 | | |
| A131 | | |
| A132 | | |
| A133 | | |
| A211 | | |
| A212 | | |
| ⋮ | | |
| A333 | | |
| ⋮ | | |

DATABASE PROCESSING SYSTEM, METHOD, PROGRAM AND PROGRAM STORAGE DEVICE

This is a continuation application of U.S. Ser. No. 09/645,543, filed Aug. 25, 2000 now abandoned.

BACKGROUND OF THE INVENTION

1. Field of the Invention

The present invention relates to a database processing method.

2. Prior Art

As a data storage method of table of relational database management system, there is a partitioning of table. As a method of table partitioning storage, there are known methods such as the key range partitioning, and hash partitioning. A technique applying these techniques is disclosed in the JP-A No. H6-139119 and JP-A No. H6-314299. In addition, a partitioning method that combines a plurality of steps of these methods is disclosed in the JP-A No. H10-269225.

The reason for partitioning these tables is not simply because a large amount of data may not be stored in one external storage device. The improvement of processing speed and concurrency by referring and updating only the specific external storage device or a logical database storage area at the time of searching is the aim, also the merits in the operation side by allowing localizing the backup and reconstruction is another aim.

In the key range partitioning and the hash partitioning, there are cases in which values of one column of table are used and cases in which values of a plurality of columns of table are used. When values of a plurality of columns of table are used, values of a plurality of columns are concatenated to insistently determine a logical database storage area as one key. In addition, in the partitioning method that combines a plurality of steps of these methods such as that disclosed in the above JP-A No. H10-269225, the multiple components of hardware configuration is used by such as the partitioning of database of first step to each of computers in a group of computers, the partitioning of database of second step to each of processors in each computer, furthermore the partitioning of database of third step to each of external storage device in each of processors. The partitioning in each phase in this is to insistently use one key.

As another conventional example, there is JP-A No. H10-240744. This is a partitioning of database with a range of one key. Furthermore, when defining a table the storage position of data is not itself determinable from the value of key. When storing data, in order to memorize one by one where is stored the data, the number of storage range of records and the key value that is included in the records are corresponded to store in the key information storage area.

Still another conventional example, there is JP-A No. H5-334165. In this disclosure the key that is used for the key range partitioning is only one key of primary key. Then, the partitioned part of table is distributed to the local database processing means to maintain. In such a circumstance the searching by a second key is enabled.

In the partitioning storage techniques of the Prior Art, when one table is partitioned to a plurality of storage areas in one processor, the key that is used for the partitioning condition is only one. Therefore in the condition that is other than the partitioning key that is only one, the narrowing of storage area is not allowed, so that the every data storage area is to be subject to be processed. Also, when a plurality of keys is used in a combination of multiple steps, the system configuration of hardware is dependent.

SUMMARY OF THE INVENTION

The present invention has been made in view of the above circumstances and has an object to overcome the above problems and to provide a database management system that solves the above problems.

In order to achieve the object as have been described above, by specifying the partitioning condition of each by using N keys where N>1 from the columns that constitute one table of a relational database, a partitioning table is defined that has a data storage areas that is a combination of every partitioned unit by each of keys to be N dimensions. In this case the hash partitioning may be combined together therewith. At this time the partitioned definition information is stored in a dictionary of the same layer, that is, in the same Data Base Management system (DBMS). In accordance with this partitioned definition information, data is stored in a plurality of logical database storage areas of multiple dimensions, at the request of query by determining the subminimal area of logical database storage from every value of partitioning keys to provide a database management system that achieves high-speed database accesses.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

DETAILED DESCRIPTION OF THE PREFERRED EMBODIMENTS

The present invention is to allow search from the viewpoint of dynamics or multiple dimension, hereinafter one preferred embodiment of the oresent invention will be described in greater details with reference to accompanying figures of FIG. 1 to FIG. 9.

Figure 1:
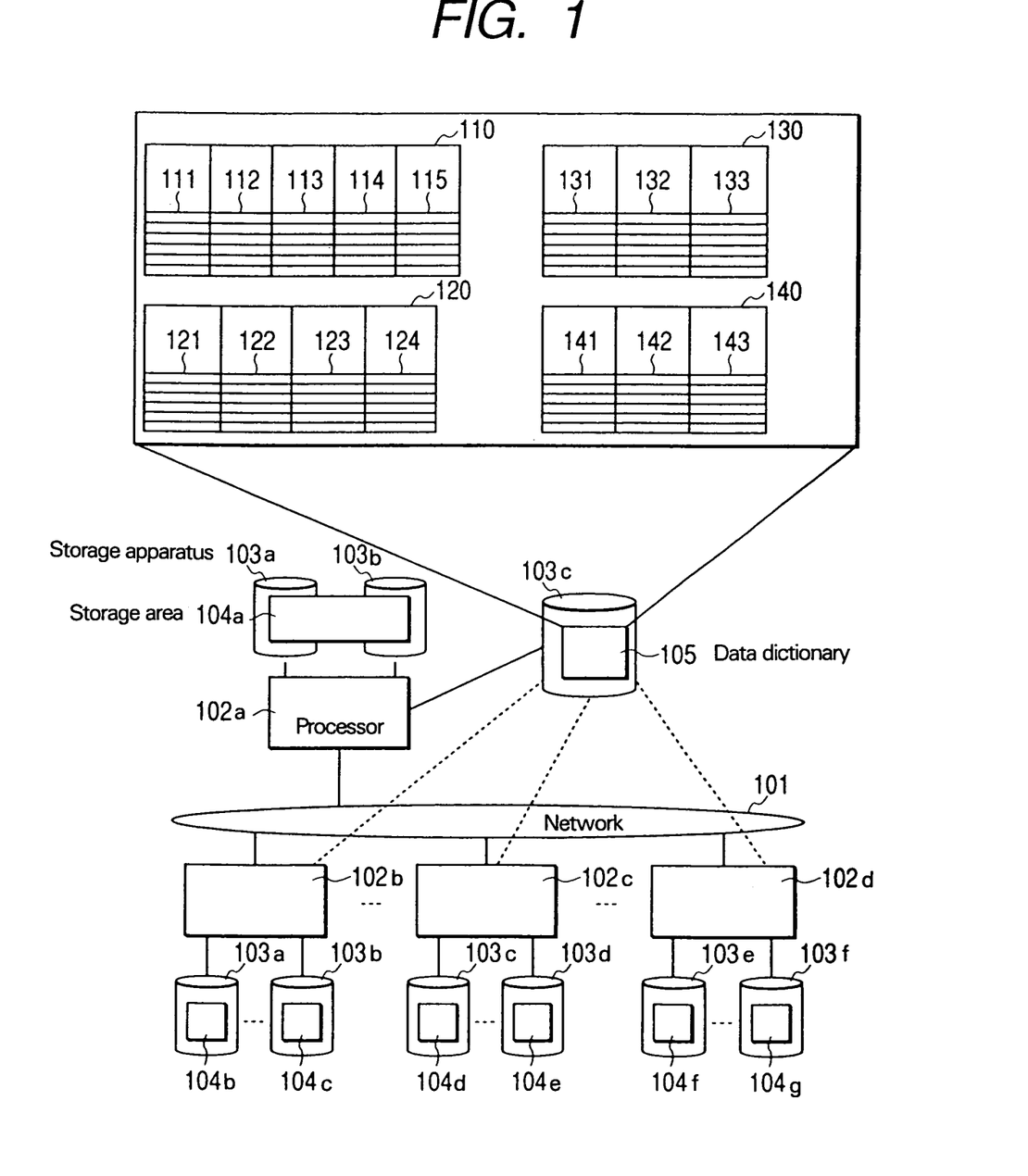
FIG. 1 is a schematic diagram of database management system in accordance with the present invention.

A structure of a database management system that implements the present invention is shown in FIG. 1. The database management system is constituted of one processor or a plurality of processors 102 that are connected by a high speed network or an inter processor connecting apparatus 101, a plurality of external storage apparatuses 103 in each of processors are also components. A logical database storage area 104 is allocated on each of external storage apparatuses, there may be cases in which it may be allocated among a plurality of external storage apparatuses. A dictionary 105 that stores the definition information of tables and the storage areas is present on the external storage apparatus, there may be cases in which it is controlled by a proprietary processor and there may be cases in which it is controlled by sharing a plurality of processors.

A dictionary table 110 of a partitioning key definition information management table is a table that manages partition definition information that is constituted of a column of table name 111, a column of partitioning key ID 112 (unique value in one table that may correspond to the specified order at the time of table definition), a column of the name of column that is a member of the partitioning key 113, a column of data types of the columns 114, and a column of the number of key ranges 115. A B tree index that is constituted of the columns 111 and 112 of this table is present in the same storage area as the dictionary table to be used for accelerating the searching process of the partitioning key definition information by the table name. The dictionary table 110 is corresponding to the D301 of FIG. 3.

A dictionary table 120 is a key range information management table that manages the range information of the Partitioning Key that is constituted of a column of table name 121, a column of partitioning key IDs 122, a column of boundary values 123 that is the upper limit of each of the partitioning areas, a column of partitioning key range numbers 124 (that become unique in the same partitioning key) that are allocated from one in accordance with the ascending order of the boundary values in the same partitioning key. Also, a B tree index that is constituted of the columns 121, 122 and 124 of this table is present in the same storage area as the dictionary table to be used for accelerating the searching process of the key range information by the table name and the partitioning key IDs. The dictionary table 120 is corresponding to the D302 of FIG. 3.

A dictionary table 130 is a partitioned table storage area management table that is constituted of a column of table name 131, a column of storage area order number allocated in the ascending order from one in accordance with the order specified by the table definition statement for each storage area (unique number in one table) 132, and a column of storage area name 133. In addition, a B tree index that is constituted of the columns 131 and 132 of this table is present in the same storage area as the dictionary table to be used for accelerating the searching process of the storage area name by the table name or by the table name and the storage area order number. The dictionary table 130 is corresponding to the D303 of FIG. 3.

A dictionary table 140 is a storage area definition information management table that manages the definition information of every storage areas in the system that is constituted of a column of storage area name 141, a column of file name of external storage device in which the storage area is present 143, and a column of processor name 142 that the external storage device is managed in addition, a B tree index that is constituted of the column 141 of this table is present in the same storage area as the dictionary table to be used for accelerating the searching process of the storage area definition information by the storage area name. The dictionary table 140 is corresponding to the D401 of FIG. 4.

Figure 2:
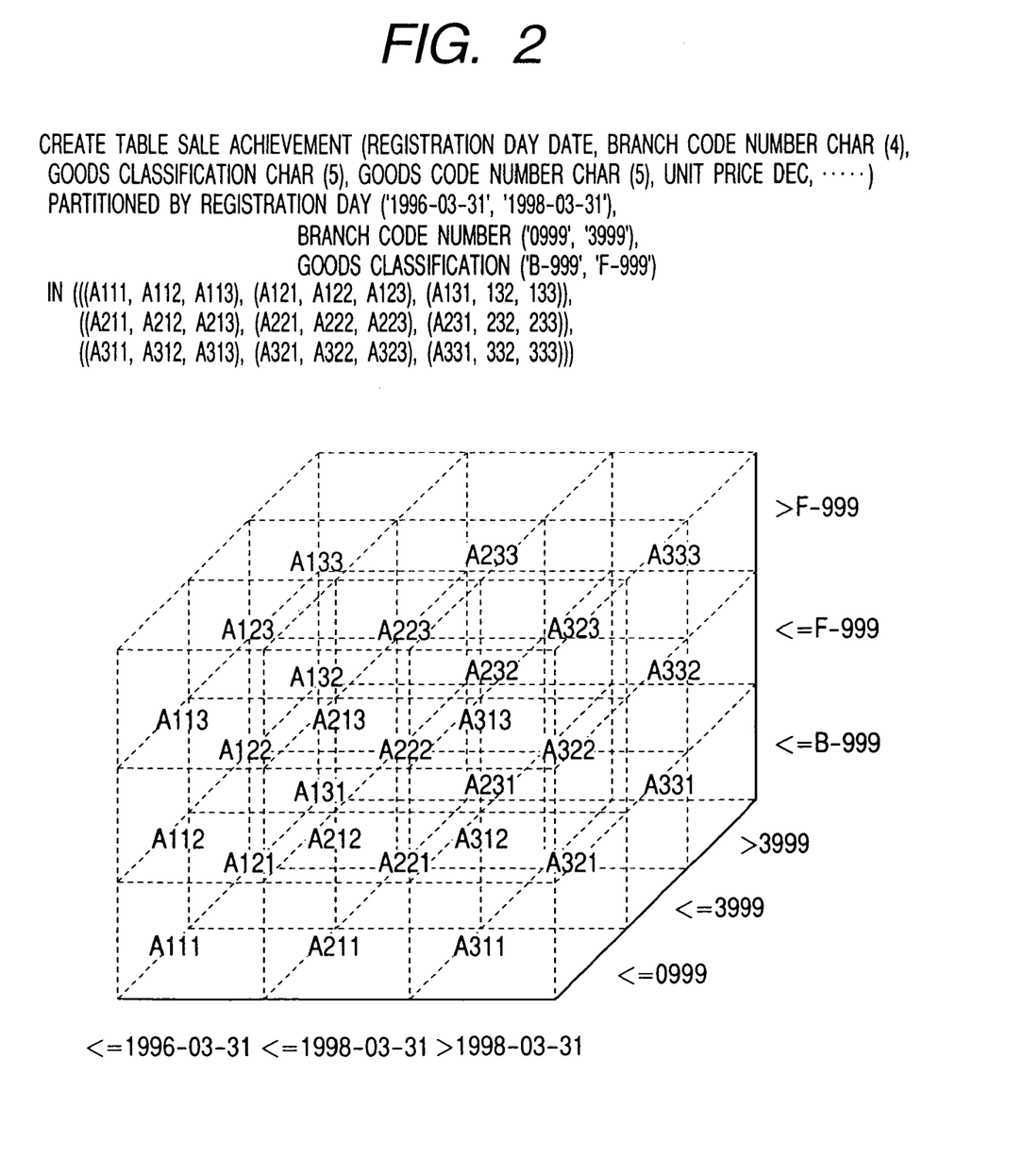
FIG. 2 is an example and image diagram of definition statement of multiple dimension partitioning.

One example of table definition statement of SQL that represent the characteristics of the present invention and the partitioned image is shown in FIG. 2. In the table of sale achievement shown in the example, among a number of component columns, three columns (registration day, branch code number, and goods classification) are independent partitioning keys respectively, for each key two partitioning boundary values are specified so as to be partitioned into three key ranges, so that in this example 27 (3 by 3 by 3) storage areas are partitioned. However, in the present invention, the number of partitioning keys, and the partitioning number by one partitioning key have non upper limit in particular, in practice it is possible to be partitioned into a huge number of storage areas. Each storage area may be present on which external storage device of which processor. It can be positioned freely in accordance with the data capacity and access frequency in the combination of each of partitioned range. Off course it can be closed to one processor.

Figure 3:
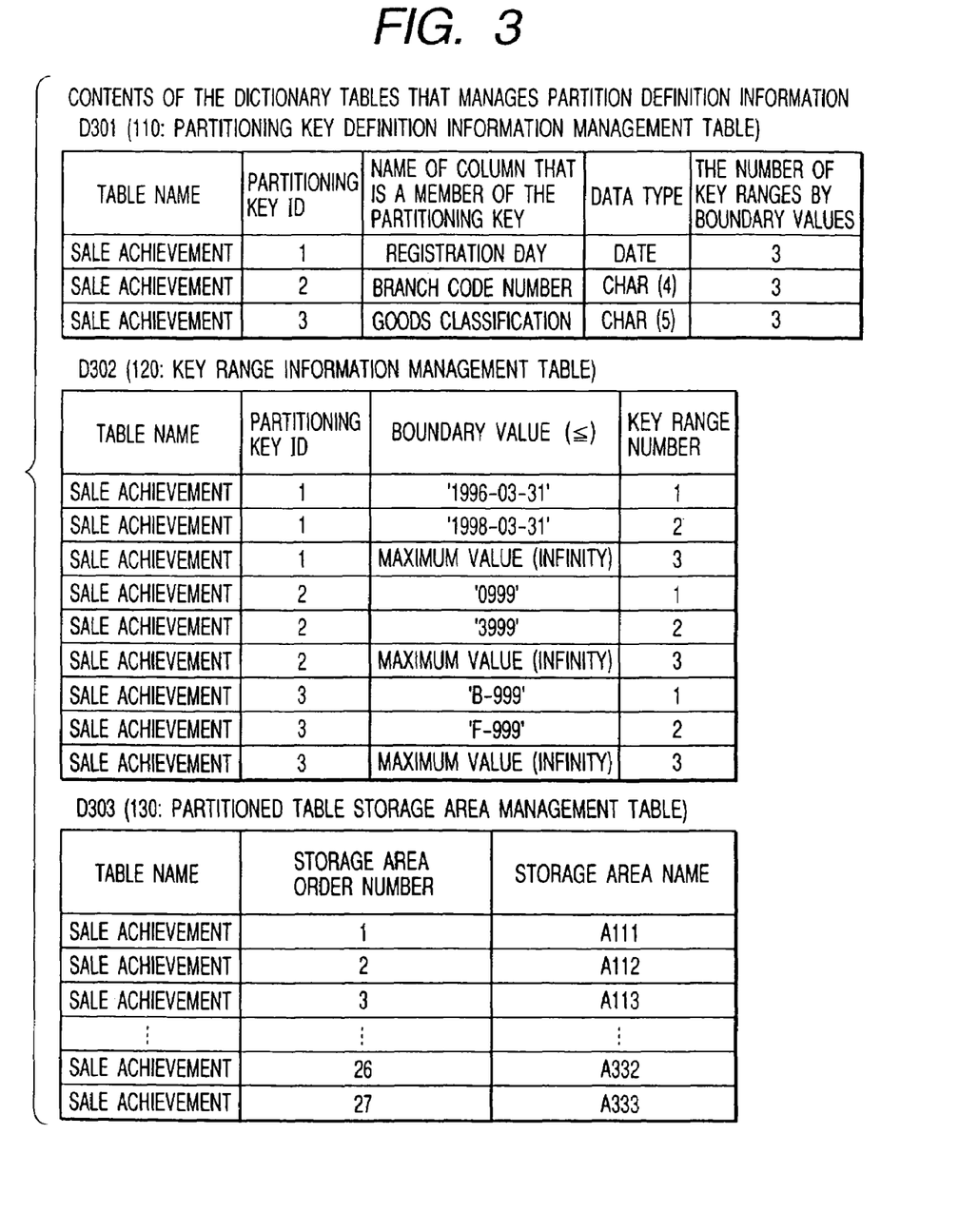
FIG. 3 is an example of the contents of dictionary table that stores the definition information of partitioned table.

The contents of dictionary table that manages the partitioned definition information of the table of the case when the table of FIG. 2 is defined is shown in FIG. 3. The D301 that is corresponding to the dictionary table 110 is a table that manages the definition information of partitioning key, that stores for each partitioning key the ID thereof (the specified order at the time when the table definition), the component columns (that is a member of partitioning key) and its data type (the number of bytes of the character data is indicated in the parenthesis), the number of partition by the boundary values and the like. The D302 that is corresponding to the dictionary table 120 is a table that manages the range information of partitioning keys, which stores the boundary values that become the upper limit of each of partitioned range in each of partitioning keys, and the key range number that is allocated in the ascending order from one. The D303 that is corresponding to the dictionary table 130 is a table that manages the information of storage area that stores the data of insertion, that stores the storage area order number that is allocated from one in the ascending order in accordance with the sequence specified in the table definition statement for each of storage area in the example as have been described above, each of three partitioning keys is partitioned to three areas so that the storage area will be partitioned from 1 to 27.

Figure 4:
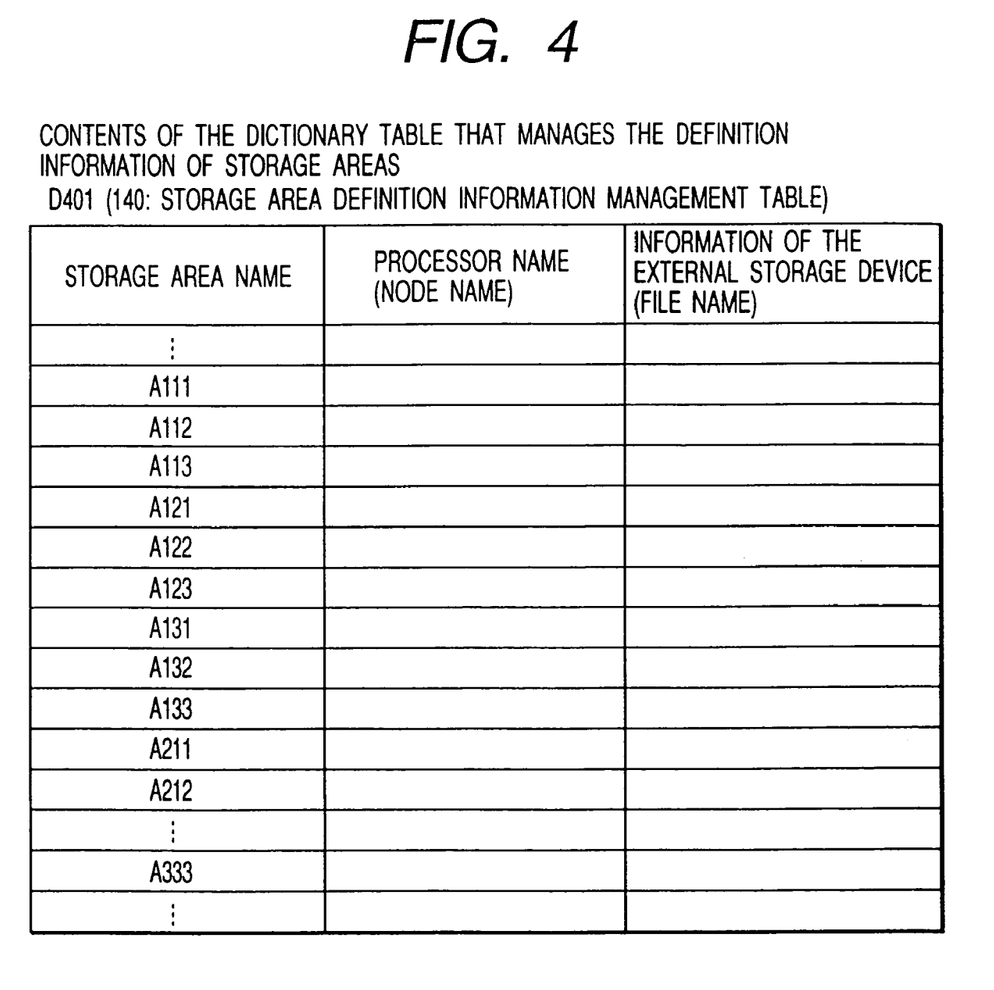
FIG. 4 is an example of the contents of dictionary table that stores the definition information of the storage area.

An example of the contents of the dictionary table that manages the definition information of the storage area is shown in FIG. 4. The D401 that is corresponding to the dictionary table 140 is a table that manages the definition information of every storage areas that are defined in the database management system, that stores the information of management node (processor) and external storage device for each of storage area.

Figure 5:
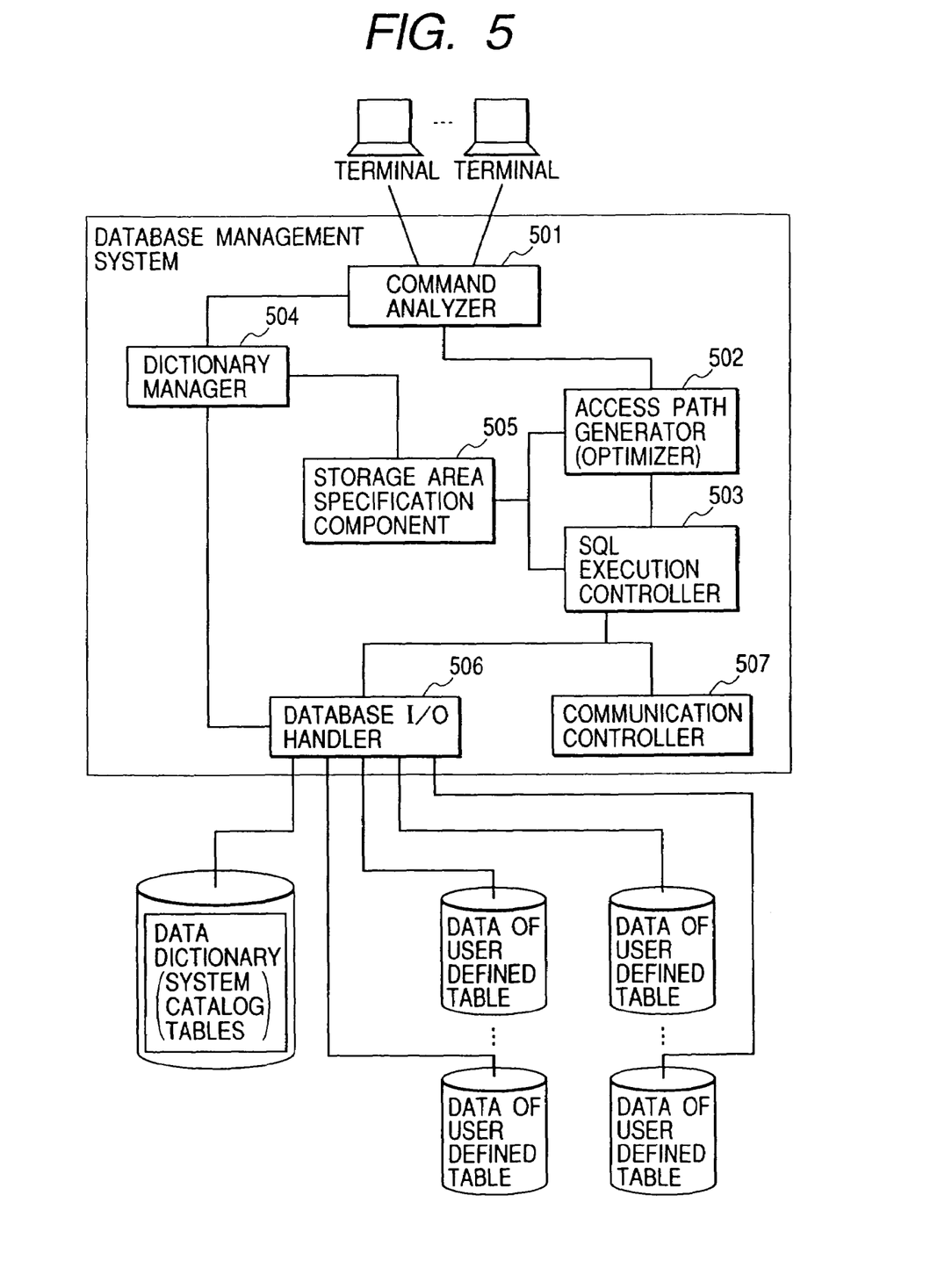
FIG. 5 is a schematic diagram illustrating the configuration with the functional components of the database management system in accordance with the present invention.

The schematic diagram of functional structure of the database management system that implements the present invention is shown in FIG. 5. The database management system is in the present invention implemented by a program, and is possible to be recordable on a computer readable recording medium. The database management system is constituted of a command analyzer 501, which receives an SQL, an access path generator (optimizer) 502, which generates an execution procedure of SQL, an SQL execution controller 503 that performs data processing in accordance with he execution procedure, a dictionary manager 504 that manages a dictionary, a storage area specification component 505 that specifies the storage area subject to be accessed in accordance with the value of input data and the search condition, a database I/O handler 506 that manages the I/O of data, a communication controller 507 that controls the communication with other processors. There are either cases in which the functional components 501 through 506 are incorporated to every processor or cases in which the functional components incorporated may be different from one processor to another in accordance with the roles of processors, the communication controller 507 is incorporated to all of the processors only in case of a plurality of processor configurations. The communication controller 507 may be incorporated where necessary.

FIG. 2 is used by way of example for describing about the method of table definition of the table "sale achievement" of the relational database. The relational database user specifies a plurality of partitioning keys, and specifies a boundary value for each of partitioning keys respectively. In this example first partitioning key is registration day, second partitioning key is branch code number, third partitioning key is goods classification, and two boundary values for each are specified (resulting in tree partitioned ranges for each). As shown in FIG. 2, these storage areas are specified by one SQL table definition statement. The storage areas that may satisfy all of the combination in accordance with the order (rule) may be specified such as the storage area (A111) in which the data that satisfies the first range of the first partitioning key and the first range of the second partitioning key and the first range of the third partitioning key is stored, the storage area (A112) in which the data that satisfies the first range of the first partitioning key and the first range of the second partitioning key and the second range of the third partitioning key is stored, the storage area (A113) in which the data that satisfies the first range of the first partitioning key and the first range of the second partitioning key and the third range of the third partitioning key is stored, the storage area (A121) in which the data that satisfies the first range of the first partitioning key and the second range of the second partitioning key and the first range of the third partitioning key is stored, and so on.

Figure 6:
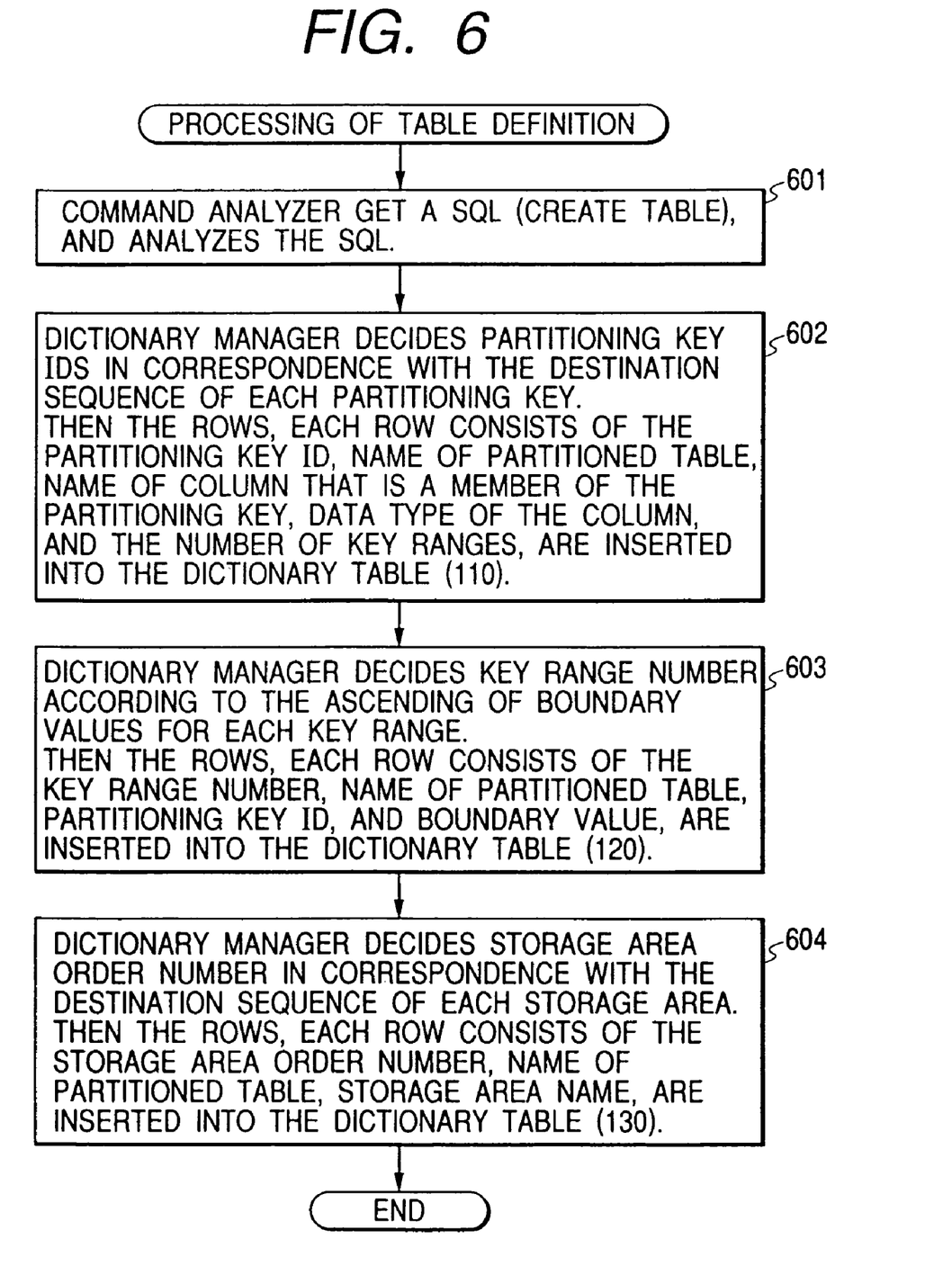
FIG. 6 is a schematic diagram illustrating the flow in the table definition.

FIG. 6 is shown with respect to the flow of the table definition. The command analyzer 501 analyzes a table definition statement (601). The analyzed partition definition information is passed to the dictionary manager 504 to store in a dictionary table as shown in FIG. 1. For the definition information for each of partitioning keys, Dictionary Manager determines Partitioning Key IDs in correspondence with the destination sequence of each Partitioning Key. Then the rows, each row is constituted of the Partitioning Kev ID, name of partitioned table, name of column that is a member of the Partitioning Key (one key may be constituted of a plurality of columns), data type of the column, and the number of key ranges, are inserted into the dictionary table 110 (602). In the example shown in FIG. 2, three columns of data will be registered to the D301. With respect to the definition information of each of partition range in each of respective partitioning keys, Dictionary Manager determines Key range number according to the ascending of boundary values for each Key range. Then the rows, each row is constituted of the Key range number, name of partitioned table, Partitioning Key ID, and boundary value, are inserted into the dictionary table 120 (603). In the example shown in FIG. 2, 9 rows of data are registered to the D302 because each of respective three partitioning keys is partitioned to three partitioned ranges. The storage area definition information with respect to the table definition, Dictionary manager determines storage area order number in correspondence with the destination sequence of each storage area. Then the rows, each row is constituted of the storage area order number, name of partitioned table, storage area name, are inserted into the dictionary table 130 (604). The number of tows corresponds to the number of storage areas, in the example as shown in FIG. 2 27 rows of data are registered to the D303.

Figure 7:
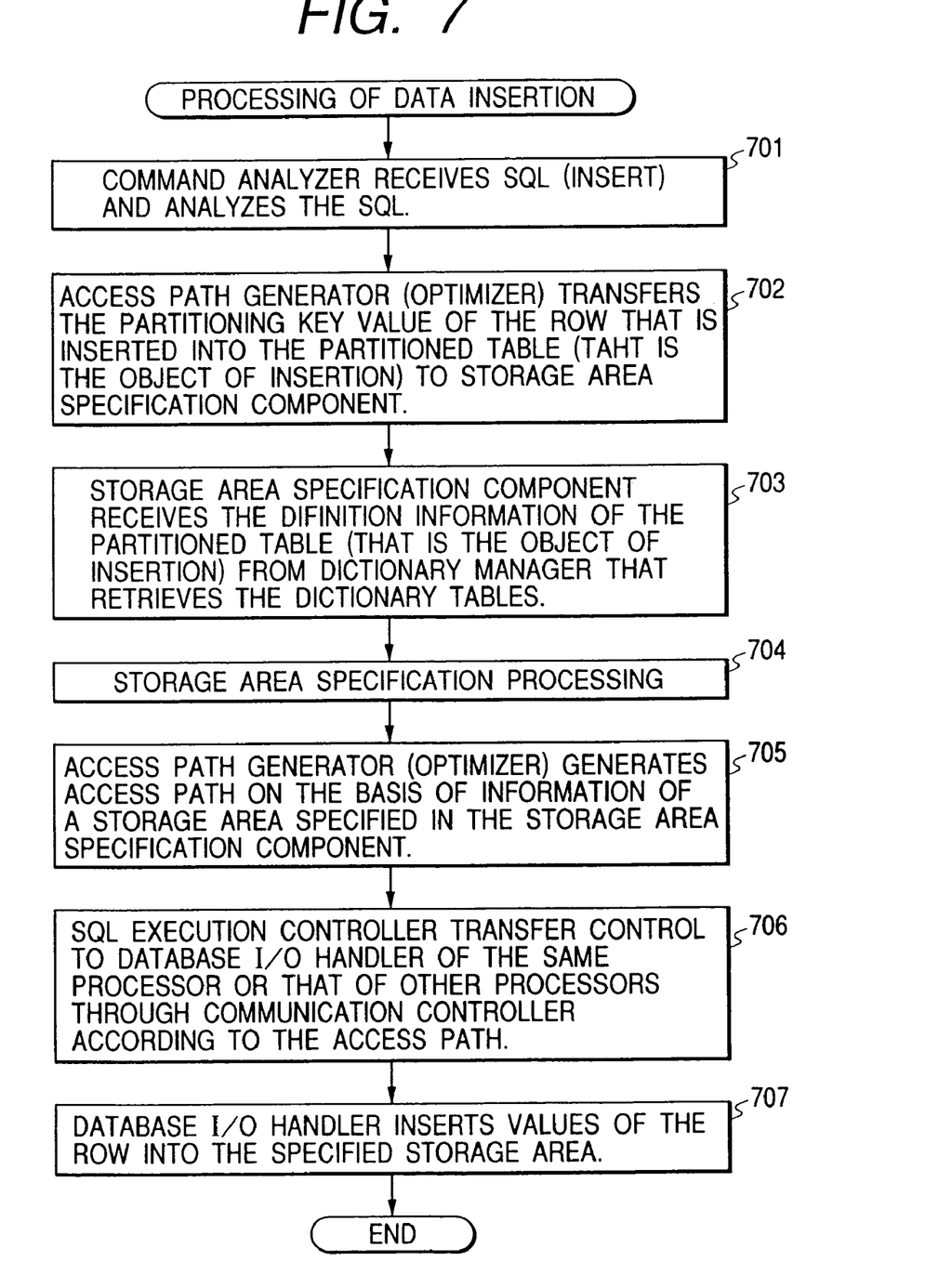
FIG. 7 is a schematic diagram illustrating the flow at the time of data insertion.

The flow in case of insertion of data to the sale achievement is shown in FIG. 7. When a database user issues an SQL that is indicative of an insertion of data from a terminal, the command analyzer 501 receives SQL and analyzes the SQL to pass the control to the access path generator (optimizer) 502 that may generate the optimum execution sequence of SQL (701). The access path generator (optimizer) 502 passes the control to the storage area specification component 505 together with the partitioning key value of the data to be inserted (702).

The storage area specification component 505 determines the partitioning definition information (110, 120) of the target table that is stored in the dictionary through the dictionary manager 504 (703), then specifies a storage area from the partitioning definition information determined and the partitioning key value of the insertion data (704, will be detailed later). The access path generator (optimizer) 502 generates access path on the basis of information of a storage area specified in the storage area specification component, then passes the control to the SQL execution controller 503 (705). The SQL execution controller 503 transfer control to database I/O handler 506 of the same processor or that 506 of other processors through communication controller 507 according to the access path (706). The database I/O handler 506 inserts the value of the rows into the specified storage area (707).

Figure 8:
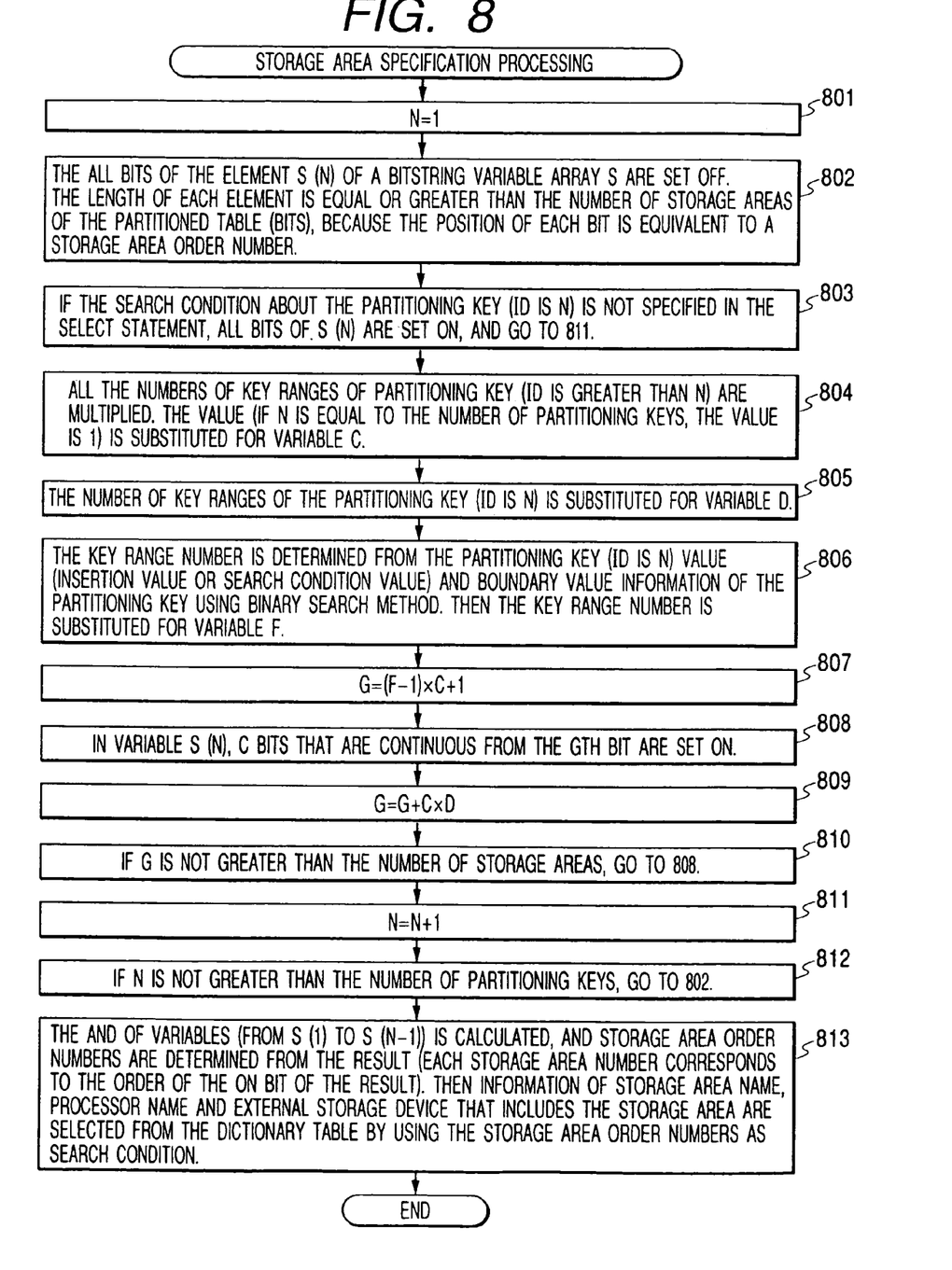
FIG. 8 is a schematic diagram illustrating the flow of process that specifies the storage area.

The flow of the storage area specification processing is shown in FIG. 8. In the figure the key range number for each of partitioning keys is determined from values of the insertion data, in addition thereto, by referring to the above example, which order number of storage areas from 1 to 27 is equivalent to the storage area is determined. At this point, when data is inserted, always a value is given with respect to the insertion data for each partitioning key. At first, the initial value 1 is assigned to the variable n that stores the partitioning key ID (801). (That is, processing the first partitioning key; with reference to the above example, processing the "registration day") Next, the all bits of the element S(n) of a bit string variable array S are set off. The length of each element is equal or greater than the number of storage areas of the Partitioned Table(bits), Because the position of each bit is equivalent to a storage area order number (802) (that is, in the above example, 27 bit strings that corresponds to the partitioning key "registration day" are provided and set to '0' as the initial value). Then in case of the specification process at the time of searching, since there are cases in which no condition value is specified with respect to a partitioning key, if the search condition about the Partitioning key (ID is n) is not specified in the SELECT statement, all bits of S(n) are set ON, and go to 811 (all storage area for the candidates of searching) (803). In case of insertion or in case in which the search condition is specified with respect to a partitioning key that the partitioning key ID be n, all the numbers (already obtained from the partitioning key definition information management table 110) of Key ranges of Partitioning key (ID is greater than n) are multiplied. Then the value (if the Partitioning key ID that is greater than n is not present, the value is 1) is substituted for variable C (804) (in the above example, if n=1, that is, if the processing of "registration day" is done, then 9, that is obtained by multiplying the number of partitioning 3 of branch code number of the partitioning key ID 2 with the number of partitioning 3 of "Goods classification" of the partitioning key ID 3, is substituted for the variable C). Then the number of partitioning of the partitioning key that the partitioning key ID is n will be substituted for the variable D (805) (in case of "registration day" D=3).

Then the value of partitioning key that the partitioning key ID is n (the insertion value or searching condition) is compared with the boundary value that is sorted in the ascending order of partitioning keys obtained from the dictionary table 120 (searching by binary search so as to accelerate the processing even if the number of partition ranges is larger) to determine the partitioning key range number, then the key range number is substituted for variable F (806). Then (F−1)×C+1 is substituted for variable G (807) (if the partitioning key range number 2 is F, then G=10). Then in variable S(n), C bits that are continuous from the Gth bit are set ON (808) (in the above example, 9 bits that are continuous from the 10 th bit of S(1) are set to ON).

Then C×D is added so as to update the value of G to the next specified storage area order number (809). If G is not greater than the number of storage areas, go to 808 to repeat the processing (810). If otherwise the number of G is greater than the maximum value of the storage area order number (in the above example if beyond 27, the processing about that partitioning key has been already completed), n is added to 1 in order to perform specification processing on the basis of the next partitioning key (811). If n is not greater than the number of partitioning keys, go to 802 to repeat processing (810) (that is, to perform the same processing as above with respect to the "branch code number" of the partitioning key ID 2 and the "goods classification" of the partitioning key ID 3). If n is greater than the number of partitioning keys, the And of variables (from S(1) to S(n−1)) is calculated (in the above example, 27 bit strings), and Storage area order numbers are determined from the result (in the above example, among 27 bits of each of respective partitioning keys, the common position of ON bits is determined. That is the storage area order number of the insertion data or selection data). The storage area order number corresponding to the bit position of ON (there is always one at the time of insertion) and table name are used for search the dictionary table 130 to determine a specified storage area name. Then information of processor name and external storage device that includes the storage area are selected from the dictionary table 140 by using the storage area name as search condition. At the time of data insertion only one storage area is determined from all of the partitioning key values (813).

Figure 9:
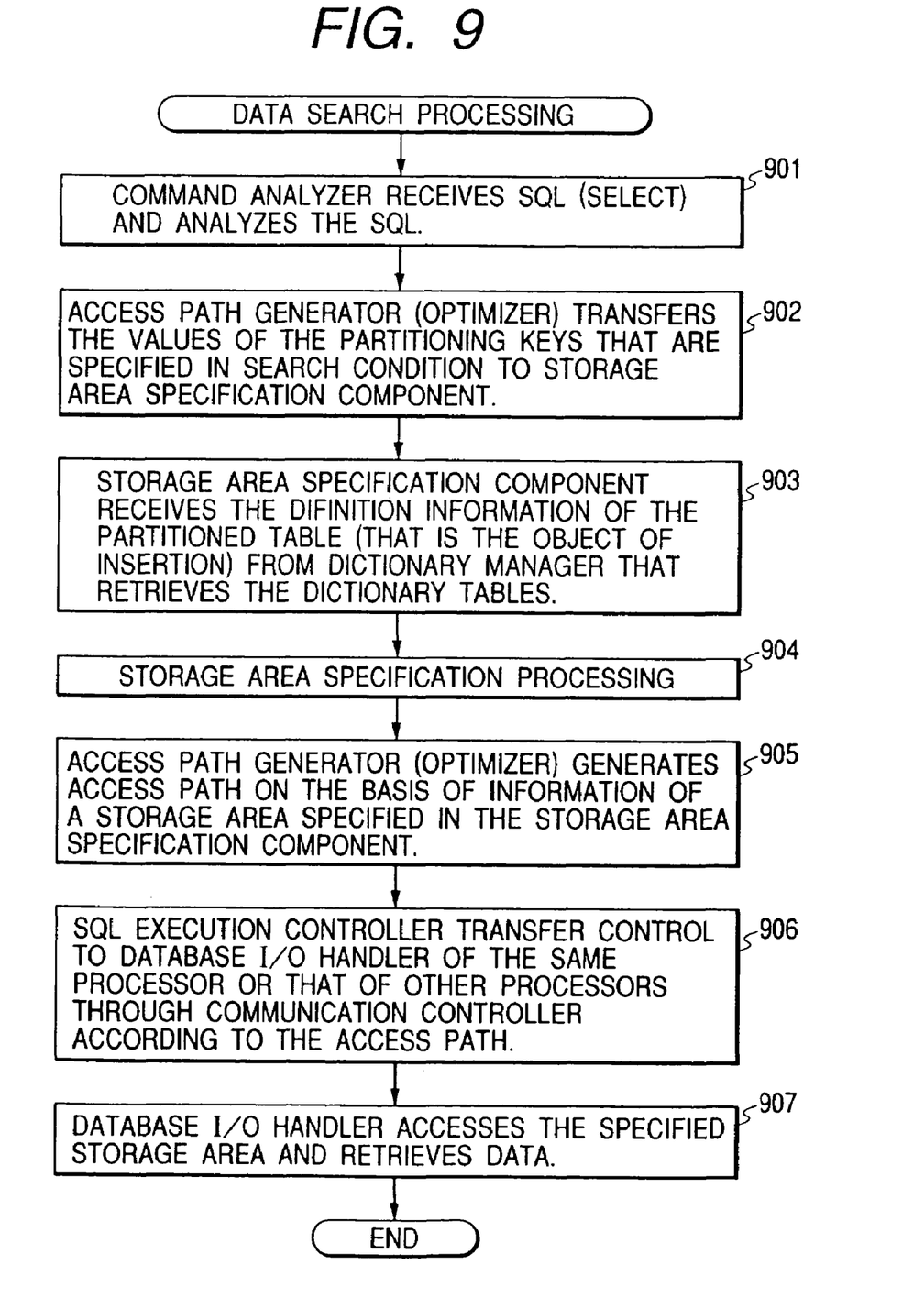
FIG. 9 is a schematic diagram illustrating the flow at the time of data search.

The flow in case of searching data from the sale achievement table is shown in FIG. 9. Once a database user issues SQL that is indicative of data searching from his terminal, the command analyzer 501 receives SQL (SELECT) and analyzes the SQL. The control is passed to the access path generator (optimizer) 502 that generates the optimum execution sequence of SQL (901). Access path generator (Optimizer) 502 transfers the values (or the range) of the Partitioning keys that are specified in search condition to storage area specification component 505 together with the control (902). The Storage area specification component 505 receives the definition information (110, 120) of the partitioned table (that is the object of select) from Dictionary manager 504 that retrieves the dictionary tables (903), to specify a storage area from thus determined partitioning definition information and the partitioning key value of the search condition (904, details is described the above) (at this time, if a value of search condition is not given to a partitioning key, a search about a plurality of storage areas is to be performed). The access path generator (optimizer) 502 generates access path on the basis of information of a storage area specified in the storage area specification component (905) and passes the control to the SQL execution controller 503. The SQL execution controller 503 then transfer control to database I/O handler 506 of the same processor or that 506 of other processors through communication controller 507 according to the access path (906). The database I/O handler accesses to the specified storage area to retrieve data (907). At the time of search of data, only if the search condition with respect to all of partitioning keys is specified only one storage area is determined. However, if the search condition with respect to any one of partitioning keys is specified, the storage area may be narrowed to eliminate the storage areas that are not required to be accessed from the search object.

The present invention may be embodied in other specific forms without departing from the spirit or essential characteristics thereof. For instance, as have been described above, in accordance with the present invention, regardless of presence or absence of the hierarchical structure such as by partitioning by each computer (system), partitioning by each processor in each computer (system), or partitioning by each storage device in each processor, by specifying a plurality (N) of partitioning keys, a large amount of storage data may be allowed to be partitioned and stored in the storage areas of N dimension. In addition, because the search processing is performed only in the optimum least required storage areas even when any partitioning key value is specified, the concurrent effectiveness and the throughput may be improved. In addition, the execution unit of backups and data reconstruction also may be set in a more flexible manner so that the operability is helped to be improved. Furthermore, a grasp of data as such may be seen from a variety of aspects by changing the key items and the numbers. From a user's view, the data items of the data to be analyzed may be allowed to change, as well as the response may be improved due to the increased throughput, the multidirectional analytical results may be obtained faster than ever.

It is to be understood that the present invention is not to be limited to the details herein given but may be modified within the scope of the appended claims.

What is claimed is:

1. A database processing method, comprising the steps of:
partitioning a relational database table into a set of partitions each corresponding to one of multiple dimensions, wherein a key range partitioning or a hash partitioning is further applied to each of said partitions;
determining columns of said database table to each of which a plurality of key ranges are allocated, wherein said columns correspond to more than two of the partitions and corresponding dimensional order, and each of said columns is provided with said plurality of key ranges beforehand;
allocating one data storage area for each of said key ranges which are assigned to each of said columns;
storing partition definition information defining how each of the data storage areas is allocated to one of the key ranges into a dictionary;
in response to a first query, referencing to said dictionary, and searching the data storage areas identified as the scope of a search, the identified data storage areas being specified by key values included in the first query and corresponding to a first column of said columns;
in response to a second query, referencing to said dictionary, and searching at least one of the data storage areas identified as the scope of a search, the identified data storage areas being specified by the key values included in the second query and corresponding to a second column of said columns different from the first column; and searching said dictionary in response to a request of data insertion to the database table, inserting data to be inserted that is included in the insertion request into the data storage area identified as the scope of an insertion, the identified data storage area being specified by a key value included in the insertion request and corresponding to a column to which said plurality of key ranges were allocated.

2. A database processing method, according to claim 1, further comprising the steps of:

in response to a request of data updating on the database table, searching said dictionary, and updating data stored in the data storage area identified as the scope of the data updating with the update data included in the update request, the identified data storage area being specified by a key value included in the update request and corresponding to a column to which said plurality of key ranges were allocated.

3. A database processing method, according to claim 1, further comprising the steps of:

in response to a search request, referencing to said dictionary, and searching the data storage areas identified as the scope of a search, the identified data storage areas being specified by key values as a search condition included in the search request and corresponding to the columns to each of which said plurality of key ranges were allocated.

4. A database processing apparatus, comprising:

a dictionary for storing definition information that defines a relational database table;

a dictionary manager for identifying columns of the database table to each of which a key range partitioning is applied, wherein said columns consist of more than two of those contained in the database table, each of said columns corresponds to one of multiple dimensions and corresponding dimensional order, and each of said columns is provided with a plurality of key ranges beforehand, allocating one data storage area for each of said key ranges which are assigned to each of said columns, creating the definition information defining how each of the data storage areas is allocated to one of the key ranges, and storing the definition information into the dictionary;

a storage area specification component for referencing to said dictionary through the dictionary manager, and searching at least one of the data storage areas identified as the scope of a search, the identified data storage areas being specified by one or more given key values; and a request execution controller for receiving a first query to obtain through the storage area specification component information of the data storage areas which are determined by key values specified by the first query and corresponding to a first column of said columns, receiving a second query to obtain through the storage area specification component information of at least one of the data storage areas which are determined by key values specified by the second query and corresponding to a second column of said columns different from the first column, receiving a request of data insertion to the database table, and inserting data to be inserted that is included in the insertion request into the data storage area obtained through the storage area specification component, the obtained data storage area being determined by a key value included in the insertion request and corresponding to a column to which said plurality of key ranges were allocated.

5. A database processing apparatus according to claim 4, wherein said request execution controller further receives a request of data updating on the database table, and updates data stored in the data storage area obtained through the storage area specification component with the update data included in the update request, the obtained data storage area being determined by a key value included in the update request and corresponding to a column to which said plurality of key ranges were allocated.

6. A database processing apparatus according to claim 4, wherein said request execution controller further receives a search request, and searches the data storage areas obtained through the storage area specification component, the obtained data storage areas being determined by key values as a search condition included in the search request and corresponding to the columns to each of which said plurality of key ranges were allocated.

7. A computer readable recording medium that stores a database processing program, said program, when executed by a computer, causing the computer to perform a method comprising the steps of:

identifying columns of a relational database table to each of which a key range partitioning is applied, wherein said columns consist of more than two of those contained in the database table, each of said columns corresponds to one of multiple dimensions and corresponding dimensional order, and each of said columns is provided with a plurality of key ranges beforehand;

allocating one data storage area for each of said key ranges which are assigned to each of said columns;

creating definition information defining how each of the data storage areas is allocated to one of the key ranges, and storing the definition information into a dictionary;

in response to a first query or a second query, referencing to said dictionary, and searching at least one of the data storage areas identified as the scope of a search, the identified data storage areas being specified by key values included in the first query or second query, respectively, and corresponding to a first column of said columns or a second column of said columns different from the first column, respectively; and in response to a request of data insertion to the database table, searching said dictionary, and inserting data to be inserted that is included in the insertion request into the data storage area identified as the scope of an insertion, the identified data storage area being specified by a key value included in the insertion request and corresponding to a column to which said plurality of key ranges were allocated.

8. A computer readable recording medium according to claim 7, said program causing the computer to perform the method further comprising the steps of:

in response to a request of data updating on the database table, searching said dictionary, and updating data stored in the data storage area identified as the scope of the data updating with the update data included in the update request, the identified data storage area being specified by a key value included in the update request and corresponding to a column to which said plurality of key ranges were allocated.

9. A computer readable recording medium according to claim 7, said program causing the computer to perform the method further comprising the steps of:

in response to a search request, referencing to said dictionary, and searching the data storage areas identified as the scope of a search, the identified data storage areas being specified by key values as a search condition included in the search request and corresponding to the columns to each of which said plurality of key ranges were allocated.

* * * * *